(12) United States Patent
Yang

(10) Patent No.: US 8,572,819 B2
(45) Date of Patent: Nov. 5, 2013

(54) ENHANCED SAFETY HOOK

(75) Inventor: Kai Chieh Yang, Taichung (TW)

(73) Assignee: Aerohook Technology Co., Ltd., Taichung (TW)

( * ) Notice: Subject to any disclaimer, the term of this patent is extended or adjusted under 35 U.S.C. 154(b) by 106 days.

(21) Appl. No.: 13/191,451

(22) Filed: Jul. 27, 2011

(65) Prior Publication Data
US 2013/0025095 A1    Jan. 31, 2013

(51) Int. Cl.
*F16B 45/02* (2006.01)
*A44B 13/00* (2006.01)

(52) U.S. Cl.
USPC ........ 24/599.5; 24/600.1; 24/599.9; 294/82.2

(58) Field of Classification Search
USPC ............ 24/599.5, 599.1, 599.9, 600.1, 599.6, 24/600.2, 599.7, 599.4, 600.8, 598.1, 24/598.4, 599.3, 599.8, 600.4, 600.6, 24/601.5, 573.09, 581.12, 582.11, 588.11, 24/598.3, 598.7, 600.5, 600.7, 600.9, 24/601.1; 294/82.19, 82.2, 82.33
See application file for complete search history.

(56) References Cited

U.S. PATENT DOCUMENTS

| 865,224 A * | 9/1907 | Applegate | 54/53 |
| 1,949,608 A * | 3/1934 | Johnson | 24/599.5 |
| 2,562,401 A * | 7/1951 | Wheeler | 24/599.6 |
| 3,798,716 A * | 3/1974 | Klein | 24/599.3 |
| 8,015,676 B1 * | 9/2011 | Choate | 24/599.5 |
| 2008/0104809 A1 * | 5/2008 | Lin | 24/600.1 |
| 2008/0120818 A1 * | 5/2008 | Belcourt et al. | 24/599.5 |
| 2011/0113603 A1 * | 5/2011 | Yang | 24/599.6 |
| 2011/0126386 A1 * | 6/2011 | Liang | 24/599.5 |
| 2012/0042487 A1 * | 2/2012 | Yang | 24/599.5 |
| 2012/0102688 A1 * | 5/2012 | Yang | 24/600.1 |

* cited by examiner

*Primary Examiner* — Robert J Sandy
*Assistant Examiner* — Michael Lee
(74) *Attorney, Agent, or Firm* — Raymond Y. Chan; David and Raymond Patent Firm

(57) ABSTRACT

An enhanced safety hook includes a hook body, a latch member, an operation handle and a spring member. The hook body includes a hook hole having a hook opening, a hook end formed at a top end thereof, a pin slot at a position below the hook opening, and a guide slot. The latch member includes a main plate and two side plates define an upside-down U-shape frame, a peripheral edge bridged between the two side plates in such a manner that a top end of the latch member constructs a mouth for receiving the hook end, a guide arm connected to the two side frames to couple with the guide slot, and a pin element coupling with the pin slot. The pin element is movably provided in the pin slot in such a manner that the mouth of the latch member is capable of detaching from the hook end, so that the latch member unlocks the hook opening by means of rotation of the pin element in the pin slot, while the guide arm slides in the guide slot for preventing the latch member from having contact with the inner wall of the hook body along the hook hole. The operation handle has a rotation hole for the pin element to pass through so as to enable the pin element to move in the pin slot. The spring member retains the latch member in a position that the latch member tends to lock the hook hole.

8 Claims, 6 Drawing Sheets

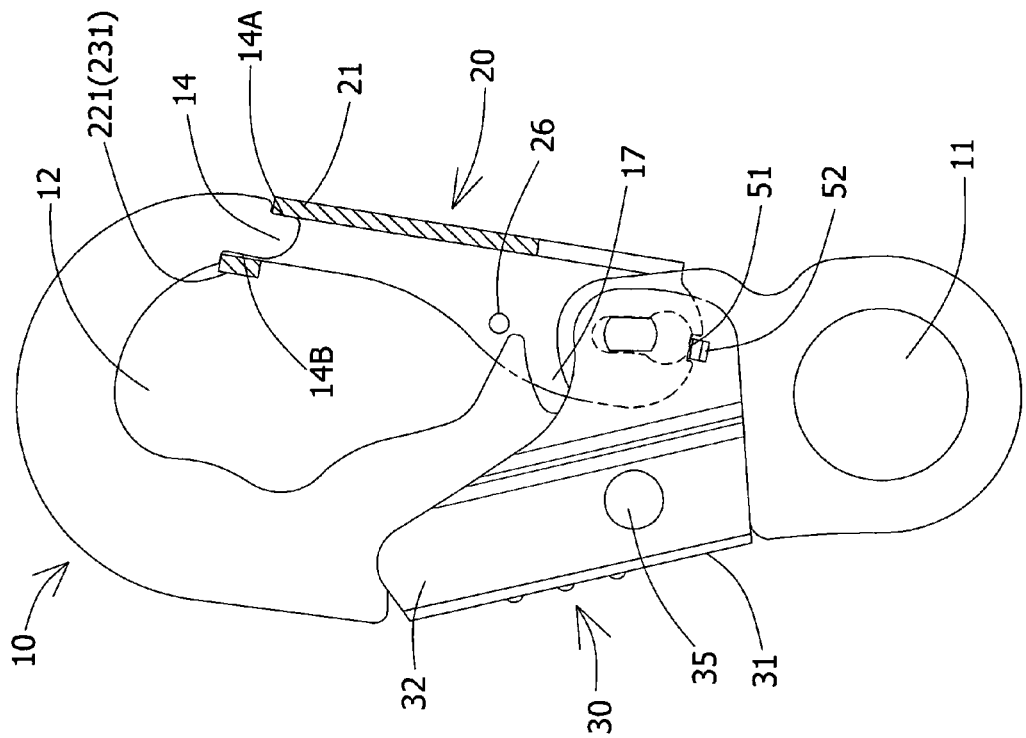
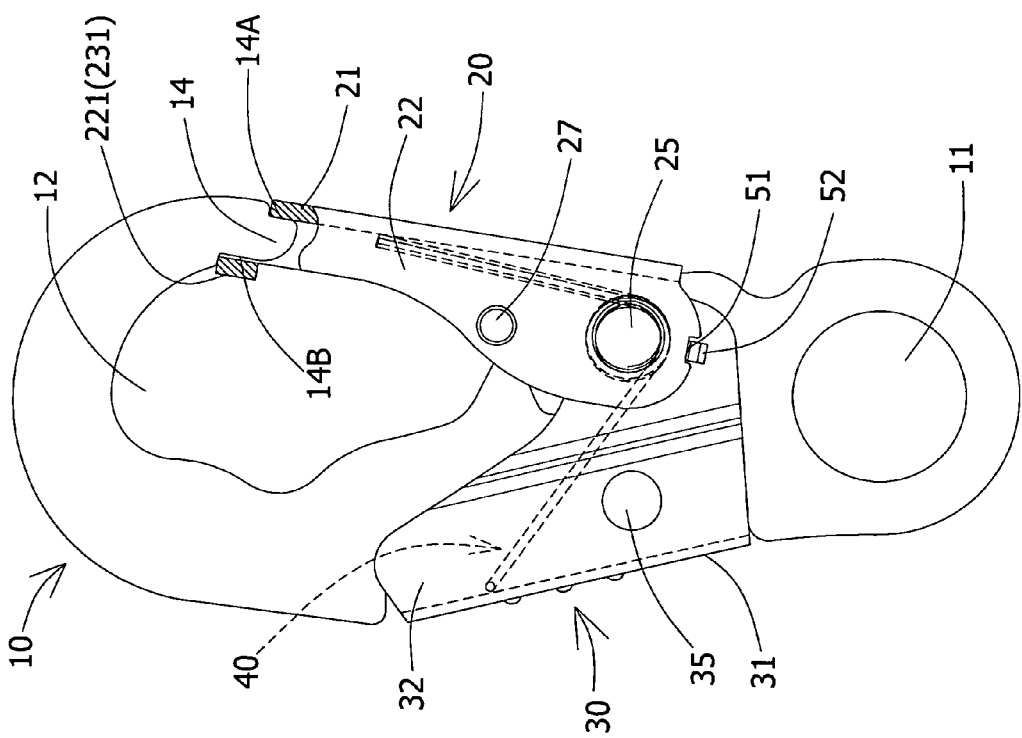
Fig.5A
Fig.5B

ENHANCED SAFETY HOOK

BACKGROUND OF THE PRESENT INVENTION

1. Field of Invention

The present invention relates to an enhanced safety hook, more particularly to an enhanced safety hook comprising a hook body and a latch member, wherein the ability of the enhanced safety hook for bearing a lateral impact force applied on the latch member is greatly increased.

2. Description of Related Arts

A conventional safety hook has a disadvantage that it cannot bear strong impact force applied to the latch member. The applicant of this application has submitted a Taiwan patent application with an application number of 098221304 in regard of this problem. However, the applicant does not feel satisfied with this achievement and finds that, in the aforesaid patent application, the latch member has a top end pivotally connected to the hook body by a first shaft, and a bottom end biasing against the inner side of the hook opening. As a result, the bottom end of the latch member and the bottom side of the hook opening are not stably supported, so that when a lateral impact force orientating towards the hook opening is applied on the latch member. Only through the engagement of the tenon and the mortise of the operation handle, the latch member is capable of distributing the lateral impact force towards the hook body. Therefore, the latch member cannot directly distribute the lateral impact force towards the hook body. Instead, the lateral impact force has to be delivered along the top end of the latch member and the tenon, so that the distributing path of the lateral impact force along the latch member is too long and may easily result in a damage and deformation to the latch member, and thus the whole safety hook may not be capable of being repeatedly used. The enhanced safety hook of the present invention successfully solves this problem.

SUMMARY OF THE PRESENT INVENTION

The main object of the present invention is to provide an enhanced safety hook comprising a hook body and a latch member, wherein the ability of the enhanced safety hook for bearing a lateral impact force applied to the latch member is greatly increased.

Additional advantages and features of the invention will become apparent from the description which follows, and may be realized by means of the instrumentalities and combinations particular point out in the appended claims.

According to the present invention, the foregoing and other objects and advantages are attained by an enhanced safety hook comprising:

a hook body having a front side and a rear side, wherein the hook body has a hook hole, a pin slot, and a guide slot penetrating the front side and the rear side, wherein the hook hole has a hook opening provided along a first side edge of the hook body, wherein the hook body comprises a hook end formed at a top end thereof, wherein the pin slot is provided at a position below the hook opening;

a latch member, wherein the latch member comprises:

a main plate and two side plates defining an upside-down U-shape frame; a peripheral edge bridged between the two side plates in such a manner that a top end of the latch member constructs a mouth for receiving the hook end;

a guide arm connected to the two side frames to couple with the guide slot; and a pin element coupling with the pin slot, wherein the pin element is movably provided in the pin slot in such a manner that the mouth of the latch member is capable of detaching from the hook end so that the latch member unlocks the hook opening by means of rotation of the pin element in the pin slot, whilst the guide arm slides in the guide slot for preventing the latch member from having contact with the inner wall of the hook body along the hook hole;

an operation handle pivotally connected to the hook body by a pivot arm, wherein the operation handle has a rotation hole for the pin element to pass through so as to enable the pin element to move in the pin slot; and a spring member retaining the latch member in a position that the latch member tends to lock the hook hole.

Therefore, when the hook end is received in the mouth of the latch member, the latch member is capable of distributing a lateral impact force applied thereon to the hook body directly, so that the deformation of the latch member is minimized when the latch member is loaded with at least a 1600 kg (about 3600 pound) impact force, and thus the safety hook can be repeatedly used.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 5A and FIG. 5B are sectional views illustrating the enhanced safety hook in the assembled state according to the above preferred embodiment of the present invention.

DETAILED DESCRIPTION OF THE PREFERRED EMBODIMENT

Referring to FIG. 1 to FIG. 7 of the drawings, an enhanced safety hook according to a preferred embodiment of the present invention is illustrated, wherein the enhanced hook comprises a hook body 10, a latch member 20, an operation handle 30 and a spring member 40.

Figure 1:
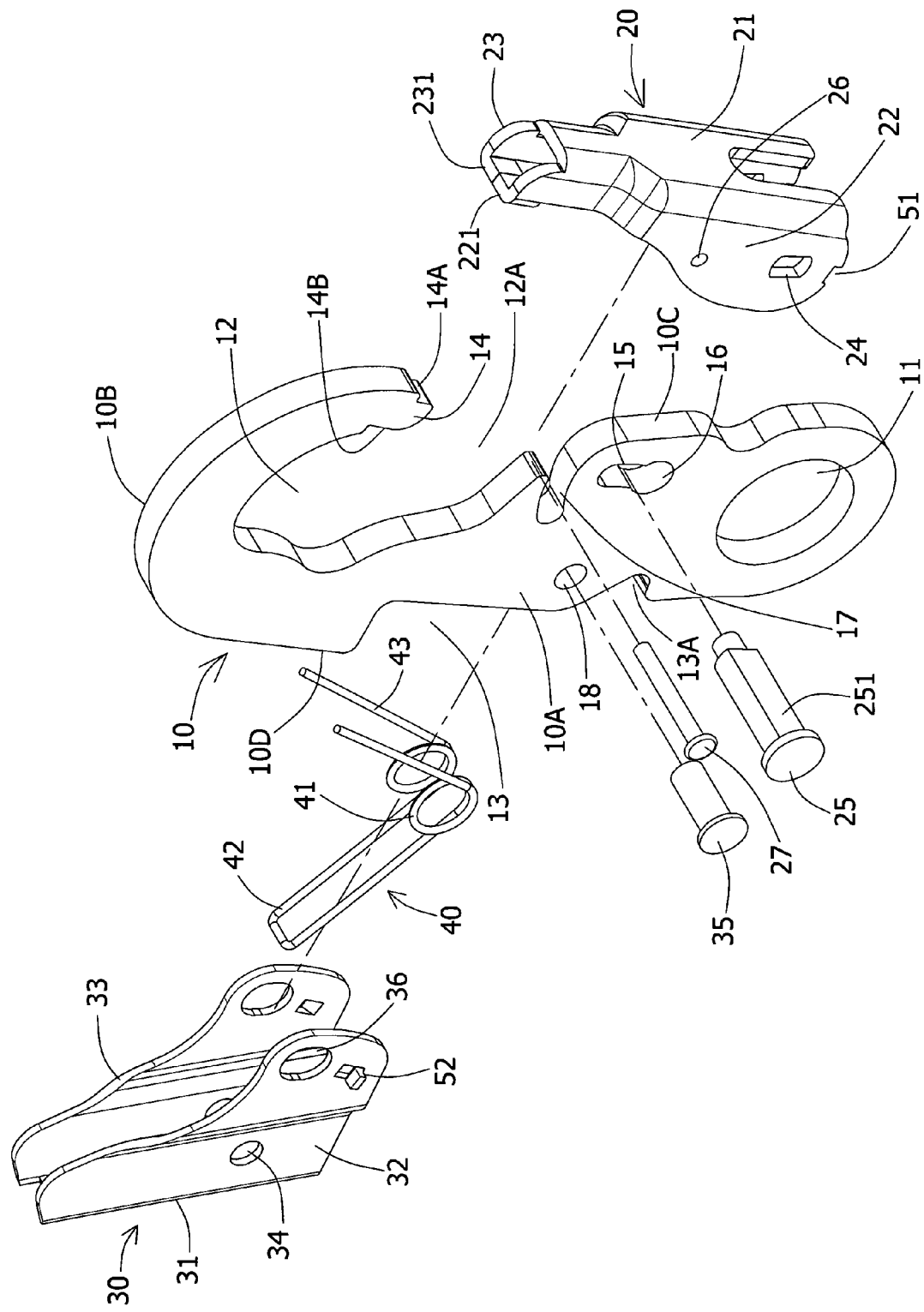
FIG. 1 is an exploded view of an enhanced safety hook according to a preferred embodiment of the present invention.
Figure 2:
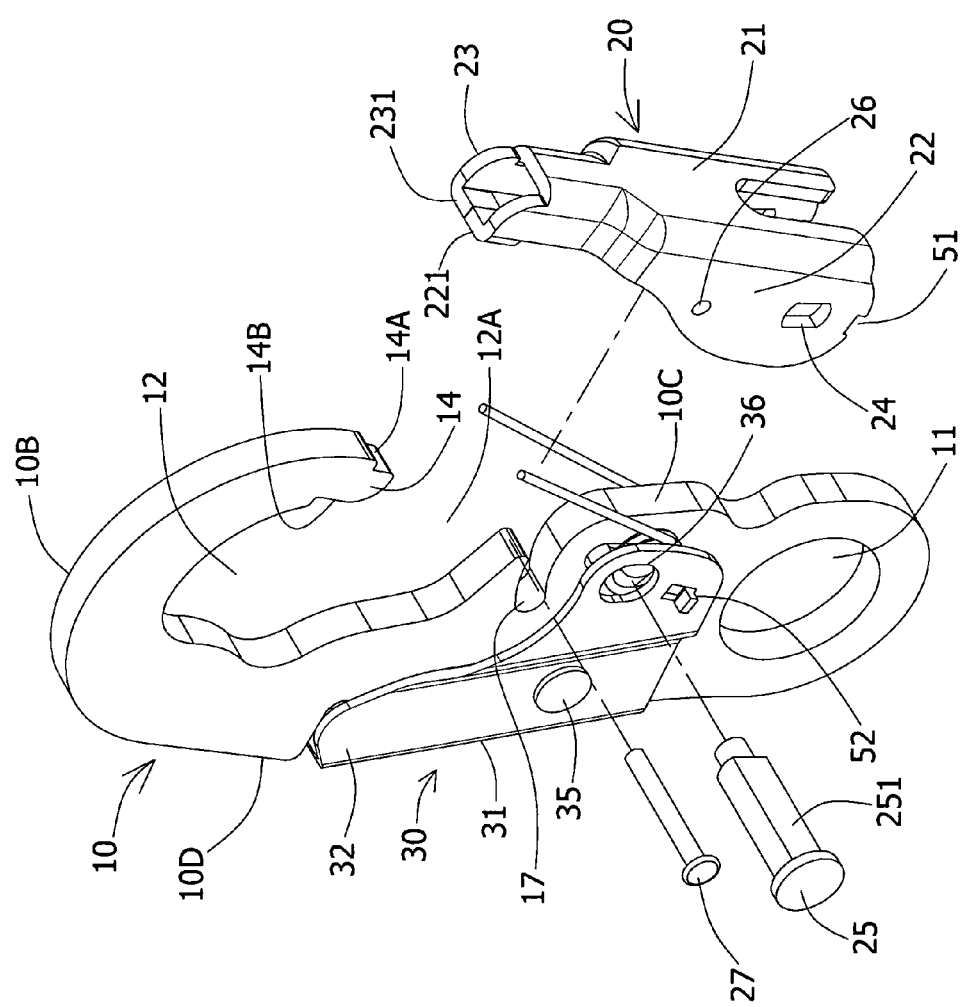
FIG. 2 is a perspective view illustrating the assembling of the hook body with the operation handle according to the above preferred embodiment of the present invention.
Figure 4:
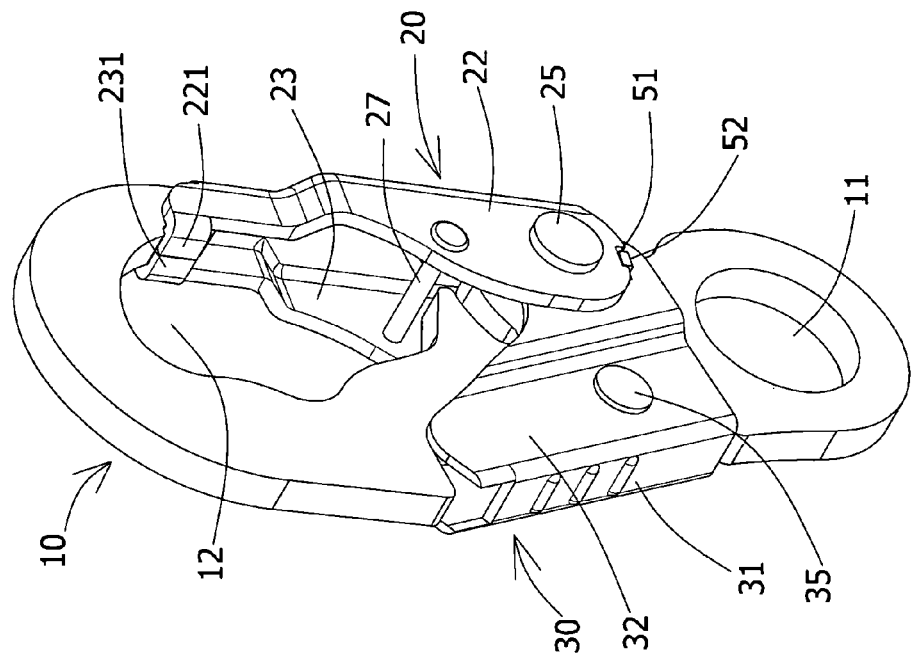
FIG. 4 is another perspective view illustrating the enhanced safety hook in the assembled state according to the above preferred embodiment of the present invention.
Figure 3:
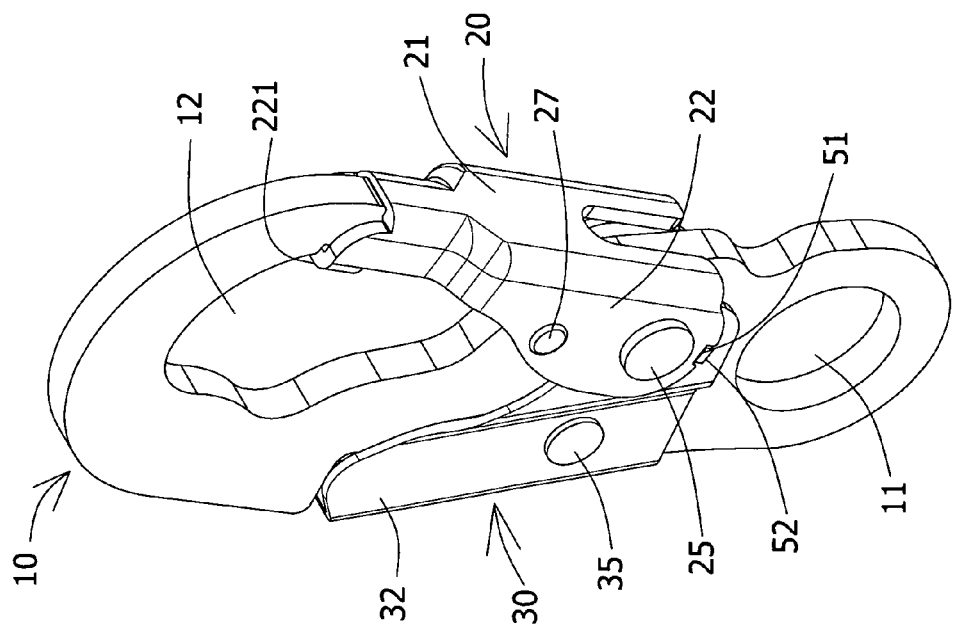
FIG. 3 is a perspective view illustrating the enhanced safety hook in an assembled state according to the above preferred embodiment of the present invention.

Referring to FIG. 1 of the drawing, the hook body 10 has a front side 10A and a rear side 10B opposite to the front side 10A, wherein the hook body 10 has a hanging hole 11, a hook hole 12, a receiving slot 13, a pin slot 15, a pin hole 16, a guide slot 17, and a first pivot hole penetrating the front side 10A and the rear side 10B respectively. The hanging hole 11 is employed for coupling with a safe belt. The hook hole 12 has a hook opening 12A provided along a first side edge 10C of the hook body 10. The receiving slot 13 has a slot opening 13A provided along a second side edge 10D of the hook body 10. The hook body 10 further comprises a hook end 14 provided on a top side of the hook opening 12A, and the hook end 14 has a first tenon surface 14A provided along the first side edge 10C of the hook body 10 and a second tenon surface 14B facing towards the hook hole 12, wherein a square measure of the second tenon surface 14B is larger than a square measure of the first tenon surface 14A. The pin slot 15 is provided at a position below the hook opening 12A and the pin hole 16 is communicating with the pin slot 15 at a position away from the hook opening 12A, wherein a hole diameter of the pin hole 16 is larger than a width of the pin slot 15. The guide slot 17 forms an arc shape path with the pin hole 16 as an arc center, wherein one side of the guide slot 17 is communicating with the hook hole 12. The first pivot hole 18 is provided at a position adjacent to the receiving slot 13.

The latch member 20 is adapted to lock and unlock the hook opening 12A, as shown in FIG. 1, FIG. 5A and FIG. 5B, wherein the latch member 20 comprises a main plate 21 and two side plates 22,23 defining an upside-down U-shape frame for the hook end 14 to be inserted therein. A top end of the main plate is biasing against the first tenon surface 14A, and the latch member 20 comprises a peripheral edge 221, 231 bridged between the two side plates 22, 23 for biasing against the second tenon surface 14B. In other words, the top end of the latch member 20 forms a mouth for receiving the hook end 14.

Figure 7:
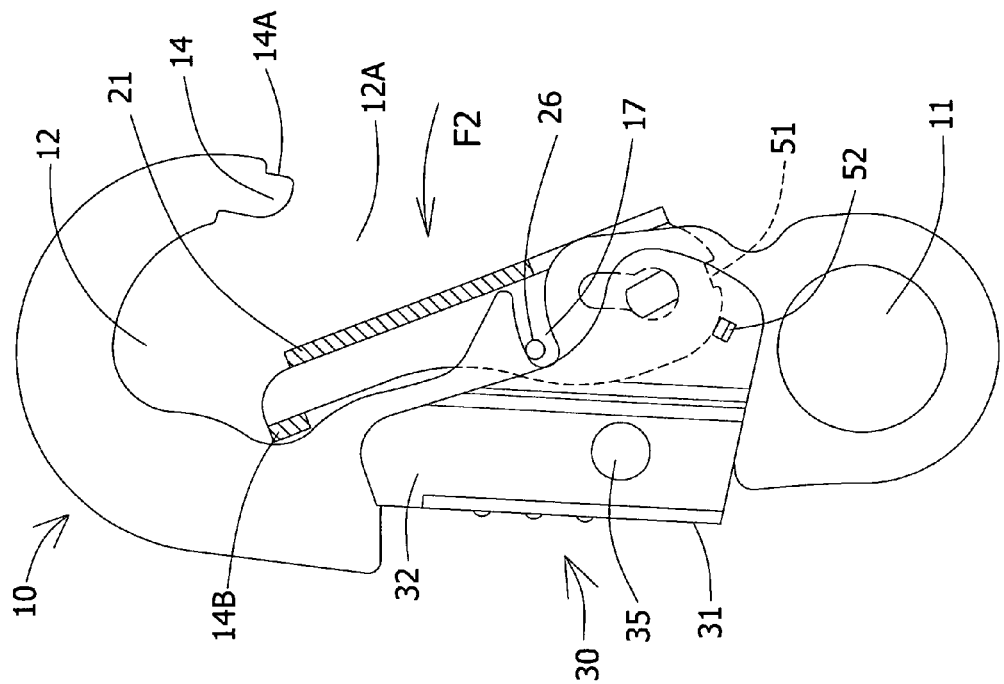
FIG. 7 is a schematic view illustrating a second step of unlocking the enhanced safety hook according to the above preferred embodiment of the present invention.
Figure 6:
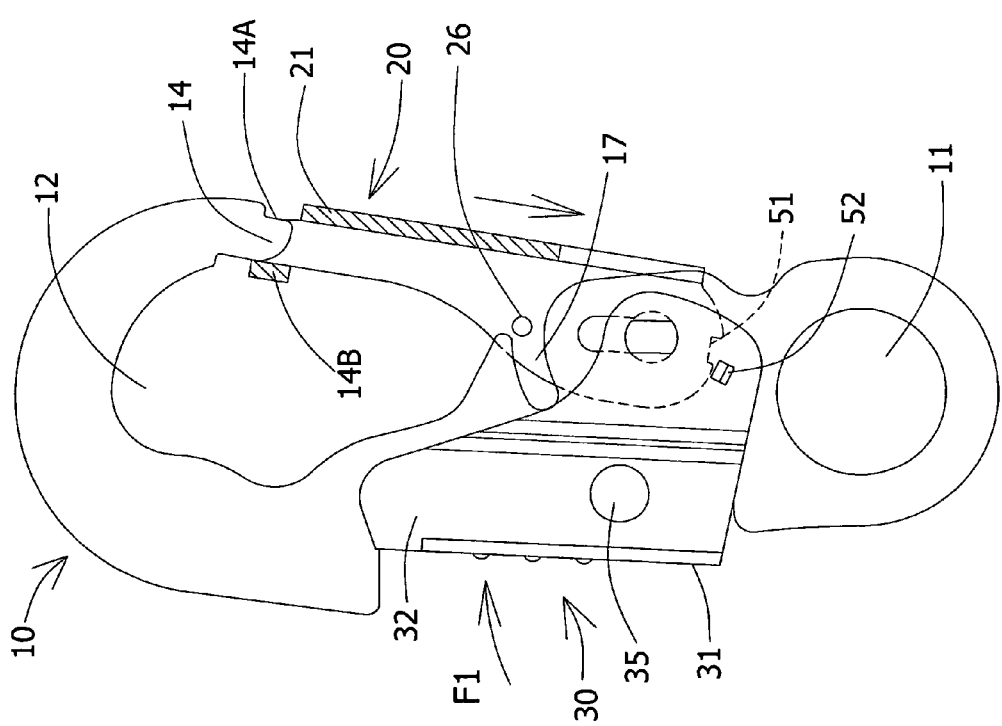
FIG. 6 is a schematic view illustrating a first step of unlocking the enhanced safety hook according to the above preferred embodiment of the present invention.

The latch member 20 further has a non-circular locking hole 24 in the two side plates 22, 23 at a position corresponding to the pin slot 15 for fixing a pin element 25, and a guide hole 26 in the two side plates 22, 23 at a position corresponding to the hook hole 12 for fixing a guide arm 27, wherein the pin element 25 has a necking pin surface 251 provided along an outer circumference thereof for sliding in the pin slot 15 and having contact with the locking hole 24, so that the pin element 25 is integrally fixed to the latch member 20. Referring to FIG. 6 to FIG. 7, when the pin element 25 moves from the pin slot 15 into the pin hole 16, the top end of the main plate 21 moves downwardly to disengage with the first tenon surface 14A while the peripheral edge 221, 231 still has contact with the second tenon surface 14B, and thus the mouth of the latch member 20 moves away from the hook end 14 so that the latch member 20 is detached from the hook end 14. At the same time, the guide arm 27 moves to a position corresponding to the guide slot 17, enabling the latch member 20 swings about the pin element 25 and the pin hole 16 towards the hook hole 12, so as to unlock the hook opening 12A, whilst the pin element 25 rotates in the pin hole 16 and the guide arm 16 slides in the guide slot 17 in such a manner that the latch member 20 is prevented from having contact with an inner wall of the hook body 10 along the hook hole 12.

The operation handle 30 comprises an end panel 31 provided in the slot opening 13A and two side panels 32, 32 connected to the end panel 31. The operation handle 30 further has a second pivot hole 34 provided in the two side panels 32, 33 at a position corresponding to the first pivot hole 18. A pivot arm 35 passes through the first pivot hole 18 and the second pivot hole 34, so that the operation handle 30 rotates about the pivot arm 35. The two side panels 32, 33 have two side portions inserted into the two side plates 22, 23 along the front side 10A and the rear side 10B respectively, wherein the operation handles further has a rotation hole 36 in the two side panels 32, 33 for the pin element 25 to pass through, as shown in FIG. 5B, FIG. 6 and FIG. 7. When an end of the operation handle 30 swings towards the receiving slot 12 about the pivot arm 35, the pin element 25 is driven to move from the pin slot 25 into the pin hole 16, but that when the end panel 31 returns to the position in the slot opening 13A, the operation handle 30 just drives the pin element 25 moves from the pin hole 16 back into the pin slot 15.

The spring member 40 comprises two retaining portions 41 encircling the pin element 25, wherein the two retaining portions 41 are biasing against the front side 10A and the rear side 10B respectively and are covered by the two side panels 32, 33. The spring member 40 further comprises a first biasing element 42 biasing against the end panel 31 of the operation handle with a first predetermined biasing force and a second biasing element 43 biasing against the main plate 21 of the latch member 20 with a second predetermined biasing force, so that the end panel 31 tends to move to be positioned in the slot opening 13A and the latch member 20 tends to lock the hook hole 12.

The enhanced safety hook further comprises a trigger arrangement having two stoppers 52 outwardly protruded on the two side panels respectively and two indents 51 formed in the two side plates 22, 23 of the latch member 20 corresponding to the two stoppers 52. When the spring member 40 retains the operation handle 30 in position, the two stoppers 52 engage with the two indents 51 respectively, so that the end panel 31 of the operation handle 30 is retained in the slot opening 13A so as to retain the pin element 25 in the pin hole 15. But when a predetermined force which overcomes the resilient force of the spring member 40 is applied to press the operation handle 30, the two stoppers 52 escapes from the two indents 51 by rotating about the pivot arm 35 respectively, so that the operation handle 30 with the rotation hole 36 leads the pin element 25 moves towards the pin hole 16, and thus the hook opening 12A is unlocked. Therefore, the latch member 20 swings to lock and unlock the hook opening 12A about the pin element 25 and the pin hole 16 as a center, and the guide arm 27 slides within the guide slot 17 to lead the latch member 20 locks and unlocks the hook opening 12A while prevents the peripheral edge 221, 231 from having contact with the with the inner wall of the hook body 10 along the hook hole 12 because of retracting force of the spring member 40 when the latch member 20 locks the hook opening 12A. And thus precisely locking and unlocking the hook opening 12A is attained.

Accordingly, the present invention is advantageous in that when the latch member 20 locks the hook opening 12A to bear a lateral impact force applied towards the hook hole 12. The top side of the latch member 20 comprises a main plate 21 basing against the first tenon surface 14A of the hook end 12 while the bottom side of the latch member 20 comprises a pin element 25 retained in the pin slot 15, so that the lateral impact force is directly distributed to the hook body 10, enabling the latch member 20 to withstand at least a 1600 kg (about 3600 pound) impact force, so that the latch member 20 not only meets a higher security requirement but also minimizes a deformation of the latch member 20.

Another advantage of the present invention is that when the latch member 20 locks the hook opening 12A to bear a reverse lateral impact force, the peripheral edge 221, 231 biases against the second tenon surface 14B, so that the latch member 20 is capable of distributing the reverse lateral force to the hook body 10 through the peripheral edge 221, 231 and the pin element 25, and thus the security of the enhanced safety hook of the present invention is attained.

Another advantage of the present invention is that the guide arm 27 slides within the guide slot 17 to lead the latch member 20 lock and unlock the hook opening 12A while prevents the peripheral edge 221, 231 from having contact with the with the inner wall of the hook body 10 along the hook hole 12, so that precisely performance of locking and unlocking the hook opening 12A is attained.

Another advantage of the present invention is that since the operation handle 30 is pivotally connected to the pin element 25, when a first force F1 is applied on the operation handle 30 to overcome the resilient force of the spring member 40, the locking engagement between the latch member 20 and the hook end 14 will be released. When a second force F2 is applied on the latch member 20 to overcome the resilient force of the spring member 40, the latch member 20 will swing to unlock the hook opening 12A about the pin element 25 and the pin hole 16. In other words, the present invention provides a two-step process for operating the enhanced safety hook. In addition, when the first force F1 is applied on the spring member 40, the resilient locking force between the spring member 40 and the latch member 20 is enhanced, so that the hook opening 12A cannot be unlocked if the second force F2 is not strong enough. Therefore, the enhanced safety hook is safe and controllable to operate.

Figure 8:
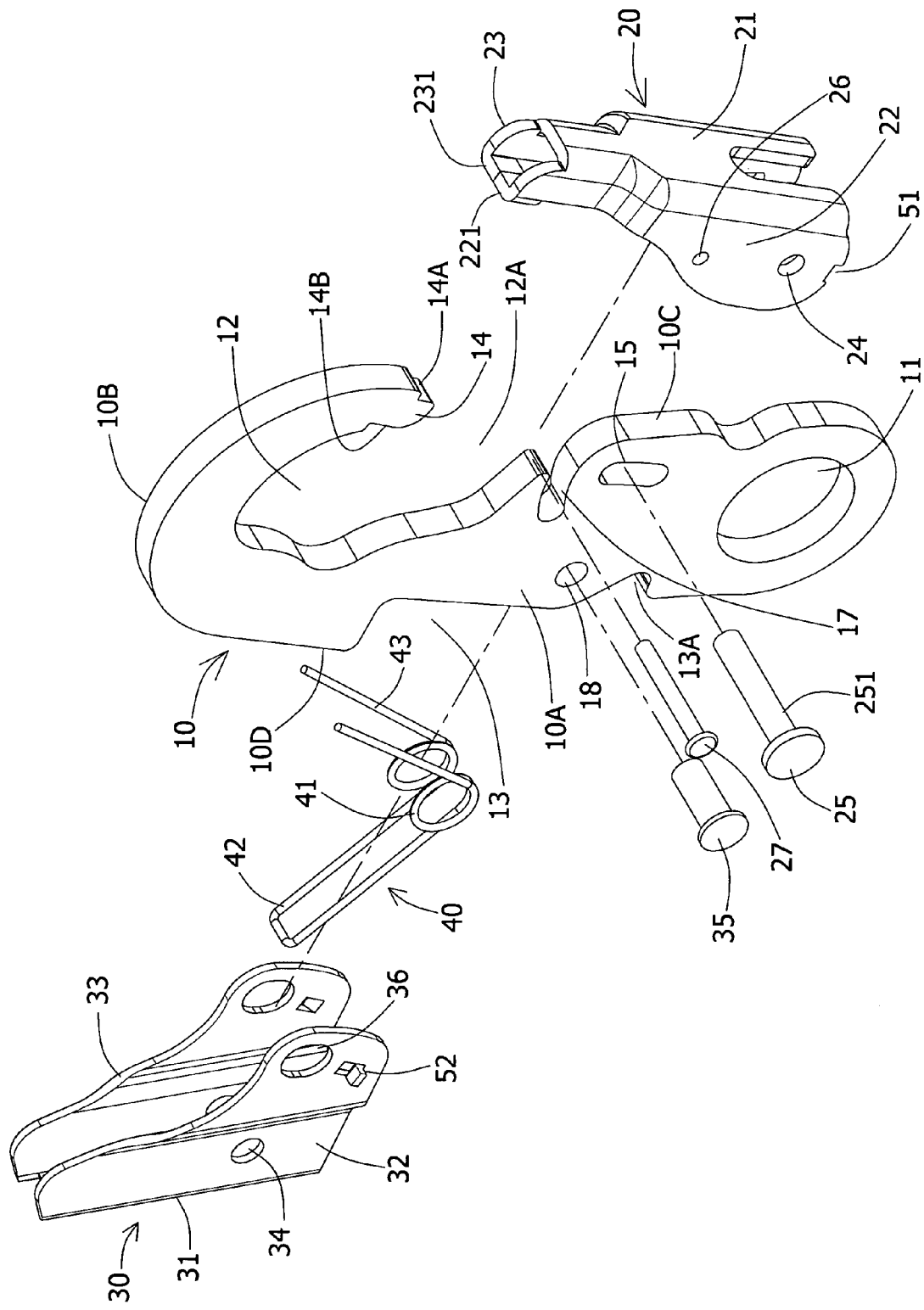
FIG. 8 is a perspective view of an enhanced safety hook according to a second preferred embodiment of the present invention.

Furthermore, referring to FIGS. 1 to 8, the pin hole 16 in FIG. 1 can be eliminated, as shown in FIG. 8, as long as the pin slot 15 has a width larger than or equal to a diameter of the pin element 25, the pin element 25 can slide or rotate in the circular locking hole 24 corresponding to an operation of locking and unlocking the hook opening 12A.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An enhanced safety hook, comprising: a hook body having a front side and a rear side, wherein said hook body has a hook hole, a pin slot and a guide slot penetrating said front side and said rear side, wherein said hook hole has a hook opening provided along a first side edge of said hook body, wherein said hook body comprises a hook end formed at a top end thereof, wherein said pin slot is provided at a position below said hook opening; a latch member, wherein said latch member comprises: a main plate and two side plates defining an upside-down U-shape frame; a peripheral edge bridged between said two side plates in such a manner that a top end of said latch member constructs a mouth for receiving said hook end; a guide arm connected to said two side frames to couple with said guide slot; and a pin element coupling with said pin slot, wherein said pin element is movably provided in said pin slot in such a manner that said mouth of said latch member is capable of detaching from said hook end so that said latch member unlocks said hook opening by means of a rotation of said pin element in said pin slot, whereby said guide arm slides in said guide slot for preventing said latch member from having contact with said inner wall of said hook body along said hook hole; an operation handle pivotally connected to said hook body by a pivot arm, wherein said operation handle has a rotation hole for said pin element to pass through so as to enable said pin element to move in said pin slot; and a spring member retaining said latch member in a position that said latch member tends to lock said hook hole, wherein said hook end has a first tenon surface provided along said first side edge of said hook body and a second tenon surface facing towards said hook hole, wherein when said hook end is received in said mouth of said latch member, a top end of said main plate biases against said first tenon surface, and said peripheral edge biases against said second tenon surface, wherein said hook body has a pin hole communicating with said pin slot, wherein when said pin element moves from being in said pin slot to in said pin hole, said top end of said main plate moves downwardly to disengage with said first tenon surface while said peripheral edge still has contact with said second tenon surface.

2. The enhanced safety hook, as recited in claim 1, wherein a square measure of said second tenon surface is larger than a square measure of said first tenon surface.

3. An enhanced safety hook, comprising: a hook body having a front side and a rear side, wherein said hook body has a hook hole, a pin slot and a guide slot penetrating said front side and said rear side, wherein said hook hole has a hook opening provided along a first side edge of said hook body, wherein said hook body comprises a hook end formed at a top end thereof, wherein said pin slot is provided at a position below said hook opening; a latch member, wherein said latch member comprises: a main plate and two side plates defining an upside-down U-shape frame; a peripheral edge bridged between said two side plates in such a manner that a top end of said latch member constructs a mouth for receiving said hook end; a guide arm connected to said two side frames to couple with said guide slot; and a pin element coupling with said pin slot, wherein said pin element is movably provided in said pin slot in such a manner that said mouth of said latch member is capable of detaching from said hook end so that said latch member unlocks said hook opening by means of a rotation of said pin element in said pin slot, whereby said guide arm slides in said guide slot for preventing said latch member from having contact with said inner wall of said hook body along said hook hole; an operation handle pivotally connected to said hook body by a pivot arm, wherein said operation handle has a rotation hole for said pin element to pass through so as to enable said pin element to move in said pin slot; and a spring member retaining said latch member in a position that said latch member tends to lock said hook hole, wherein said guide slot forms an arc shape path with said pin hole as an arc center, wherein a side of said guide slot is communicating with said hook hole, wherein when said pin element is in said pin slot, said guide arms are in said hook hole, wherein when said pin element moves from said pin slot into said pin hole, said guide arm moves to a position corresponding to said guide slot, so that said guide arm moves in said guide slot during said latch member locking or unlocking said hook opening.

4. An enhanced safety hook, comprising: a hook body having a front side and a rear side, wherein said hook body has a hook hole, a pin slot and a guide slot penetrating said front side and said rear side, wherein said hook hole has a hook opening provided along a first side edge of said hook body, wherein said hook body comprises a hook end formed at a top end thereof, wherein said pin slot is provided at a position below said hook opening; a latch member, wherein said latch member comprises: a main plate and two side plates defining an upside-down U-shape frame; a peripheral edge bridged between said two side plates in such a manner that a top end of said latch member constructs a mouth for receiving said hook end; a guide arm connected to said two side frames to couple with said guide slot; and a pin element coupling with said pin slot, wherein said pin element is movably provided in said pin slot in such a manner that said mouth of said latch member is capable of detaching from said hook end so that said latch member unlocks said hook opening by means of a rotation of said pin element in said pin slot, whereby said guide arm slides in said guide slot for preventing said latch member from having contact with said inner wall of said hook body along said hook hole; an operation handle pivotally connected to said hook body by a pivot arm, wherein said operation handle has a rotation hole for said pin element to pass through so as to enable said pin element to move in said pin slot; a spring member retaining said latch member in a position that said latch member tends to lock said hook hole, and a trigger arrangement having two stoppers outwardly protruded on said two side panels respectively and two indents formed in said two side plates of said latch member corresponding to said two stoppers, wherein when said spring member retains said operation handle in position, said two stoppers engage with said two indents respectively, so that said end panel of said operation handle is retained in said slot opening so as to retain said pin element in said pin hole, wherein when a predetermined force which overcomes said resilient force of said spring member is applied to press said operation handle, said two stoppers escapes from said two indents with respect to said pivot arm respectively.

5. The enhanced safety hook, as recited in claim 4, wherein said trigger arrangement retains said operation handle in position in such a manner that said two stoppers engage with said two indents respectively.

6. An enhanced safety hook, comprising: a hook body having a front side and a rear side, wherein said hook body has a hook hole, a pin slot and a guide slot penetrating said front side and said rear side, wherein said hook hole has a hook opening provided along a first side edge of said hook body, wherein said hook body comprises a hook end formed at a top end thereof, wherein said pin slot is provided at a position below said hook opening; a latch member, wherein said latch member comprises: a main plate and two side plates defining an upside-down U-shape frame; a peripheral edge bridged between said two side plates in such a manner that a top end of said latch member constructs a mouth for receiving said hook end; a guide arm connected to said two side frames to couple with said guide slot; and a pin element coupling with said pin slot, wherein said pin element is movably provided in said pin slot in such a manner that said mouth of said latch member is capable of detaching from said hook end so that said latch member unlocks said hook opening by means of a rotation of said pin element in said pin slot, whereby said guide arm slides in said guide slot for preventing said latch member from having contact with said inner wall of said hook body along said hook hole; an operation handle pivotally connected to said hook body by a pivot arm, wherein said operation handle has a rotation hole for said pin element to pass through so as to enable said pin element to move in said pin slot; and a spring member retaining said latch member in a position that said latch member tends to lock said hook hole, wherein said hook body further has a receiving slot penetrating said front side and said rear side of said hook body, wherein said receiving slot has a slot opening along a second side edge of said hook body, wherein said operation handle comprises an end panel, two side panels connected to said end panel, a pivot arm coupled with said two side panels, and a rotation hole provided in said two side panels, wherein said spring member retains said end panel to be in said slot opening, wherein when an end of said operation handle swings towards said receiving slot about said pivot arm, said pin element is driven to bring said mouth of said latch member away from said hook end, wherein when said end panel returns to be positioned in said slot opening, said operation handle just drives said pin element to make said mouth of said latch member be back to engage with said hook end.

7. The enhanced safety hook, as recited in claim 6, wherein said two side panels have two side portions inserted into said two side plates along said front side and said rear side of said hook body respectively, wherein said pin element pivotally passes through said rotation hole.

8. The enhanced safety hook, as recited in claim 6, wherein said spring member comprises two retaining portions encircling said pin element, wherein said two retaining portions are biasing against said front side and said rear side respectively and are at a position between said hook body and said two side panels, wherein said spring member further comprises a first biasing element and a second biasing element extending from said two retaining portions, wherein said first biasing element biases against said end panel of said operation handle with a first predetermined biasing force and said second biasing element biases against said main plate of said latch member with a second predetermined biasing force.

* * * * *